United States Patent
Wang et al.

(10) Patent No.: US 6,872,785 B2
(45) Date of Patent: Mar. 29, 2005

(54) MULTI-LAYER NANO-PARTICLE PREPARATION AND APPLICATIONS

(75) Inventors: Xiaorong Wang, Hudson, OH (US); Victor J. Foltz, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 101 days.

(21) Appl. No.: 10/331,841

(22) Filed: Dec. 30, 2002

(65) Prior Publication Data

US 2003/0149185 A1 Aug. 7, 2003

Related U.S. Application Data

(63) Continuation-in-part of application No. 10/223,393, filed on Aug. 19, 2002, and a continuation-in-part of application No. 10/038,748, filed on Dec. 31, 2001, now Pat. No. 6,689,469, which is a continuation-in-part of application No. 09/970,830, filed on Oct. 4, 2001, now Pat. No. 6,437,050.

(51) Int. Cl.[7] .................................................. C08F 8/04
(52) U.S. Cl. .................... 525/313; 525/314; 525/332.2; 525/332.9; 525/338; 525/339
(58) Field of Search ................................. 525/313, 314, 525/332.2, 332.9

(56) References Cited

U.S. PATENT DOCUMENTS

| | | | |
|---|---|---|---|
| 4,247,434 A | | 1/1981 | Vanderhoff et al. |
| 4,659,790 A | * | 4/1987 | Shimozato et al. ........... 526/87 |
| 4,773,521 A | | 9/1988 | Chen |
| 4,829,135 A | | 5/1989 | Gunesin et al. |
| 4,942,209 A | | 7/1990 | Gunesin |
| 5,331,035 A | | 7/1994 | Hall |
| 5,336,712 A | | 8/1994 | Austgen, Jr. et al. |
| 5,395,902 A | | 3/1995 | Hall |
| 5,594,072 A | | 1/1997 | Handlin, Jr. et al. |
| 5,614,579 A | | 3/1997 | Roggeman et al. |
| 5,688,856 A | | 11/1997 | Austgen, Jr. et al. |
| 5,763,551 A | | 6/1998 | Wünsch et al. |
| 5,847,054 A | | 12/1998 | McKee et al. |
| 5,883,173 A | | 3/1999 | Elspass et al. |
| 5,891,947 A | | 4/1999 | Hall et al. |
| 6,087,016 A | | 7/2000 | Feeney et al. |
| 6,147,151 A | | 11/2000 | Fukumoto et al. |
| 6,255,372 B1 | | 7/2001 | Lin et al. |
| 6,437,050 B1 | | 8/2002 | Krom et al. |
| 6,649,702 B1 | * | 11/2003 | Rapoport et al. ........... 525/299 |

OTHER PUBLICATIONS

Star Polymers by Immobilizing Functional Block Copolymers, by Koji Ishizu, Tokyo Institute of Technology, Meguro–ku, Tokyo, Japan, *Star and Hyperbranched Polymers*, 1999, ISBN 0–8247–1986–7.

Formation of Worm–like Micelles from a Polystyrene–Polybutadiene–Polystyrene Block Copolymer in Ethyl Acetate, Canham et al., J.C.S. Faraday I, 1980, 76, 1857–1867.

Anomalous Behaviour of Solutions of Styrene–Butadiene Block Copolymers in Some Solvents, Tuzar et al., Makromol. Chem. 178, 22743–2746 (1977).

Association of Block Copolymers in Selective Solvents, 1 Measurements on Hydrogenated Poly(styrene–isoprene) in Decane and in *trans*–Decalin, Mandema et al., Makromol. Chem. 180, 1521–1538 (1979).

Light–Scattering Studies of a Polystyrene–Poly(methyl methacrylate) Two–Block Copolymer in Mixed Solvents, Utiyama et al., Macromolecules vol. 7, No. 4, Jul.–Aug., 1974.

* cited by examiner

*Primary Examiner*—Bernard Lipman
(74) *Attorney, Agent, or Firm*—Scott A. McCollister

(57) ABSTRACT

A multi-layer nano-particle composition including a polymer core and at least two additional layers is provided. The nano-particles have a mean average diameter less than about 100 nm. The nano-particles can be modified via, for example, hydrogenation or functionalization. The nano-particles can be advantageously incorporated into rubbers, elastomers, and thermoplastics.

28 Claims, 4 Drawing Sheets

MULTI-LAYER NANO-PARTICLE PREPARATION AND APPLICATIONS

This application is a continuation-in-part of U.S. Ser. No. 10/223,393 filed Aug. 19, 2002, which is a continuation-in-part of U.S. Ser. No. 09/970,830 (filed Oct. 4, 2001), now U.S. Pat. No. 6,437,050 and U.S. Ser. No. 10/038,748 (filed Dec. 31, 2001) now U.S. Pat. No. 6,689,469.

BACKGROUND OF THE INVENTION

The present invention relates to polymer nano-particles, methods for their preparation, and their use as, for example, additives for rubber, including natural and synthetic elastomers. The invention advantageously provides several mechanisms for surface modification, functionalization, and general characteristic tailoring to improve performance in rubbers, elastomers, and thermoplastics.

Polymer nano-particles have attracted increased attention over the past several years in a variety of fields including catalysis, combinatorial chemistry, protein supports, magnets, and photonic crystals. Similarly, vinyl aromatic (e.g. polystyrene) microparticles have been prepared for uses as a reference standard in the calibration of various instruments, in medical research and in medical diagnostic tests. Such polystyrene microparticles have been prepared by anionic dispersion polymerization and emulsion polymerization.

One benefit of using nano-particles as an additive in other materials is that they can be discrete particles uniformly dispersed throughout a host composition. Nano-particles preferably are monodisperse in size and uniform in shape. However, controlling the size of nano-particles during polymerization and/or the surface characteristics of such nano-particles can be difficult. Accordingly, achieving better control over the surface composition of such polymer nano-particles also is desirable.

Rubbers may be advantageously modified by the addition of various polymer compositions. The physical properties of rubber moldability and tenacity are often improved through such modifications. Of course, however, the indiscriminate addition of nano-particles to rubber may cause degradation of the matrix material, i.e., the rubber, characteristics. Moreover, it is expected that primarily through the selection of nano-particles having suitable size, material composition, and surface chemistry, etc., will improve the matrix characteristics.

In this regard, development of nano-particles having a surface layer which would be compatible with a wide variety of matrix materials is desirable because discrete particles could likely disperse more evenly throughout the host to provide a uniform matrix composition. However, the development of a process capable of reliably producing acceptable nano-particles has been a challenging endeavor. For example, the solubility of various monomers in traditional alkane solvents has made solution polymerization a difficult process by which to achieve nano-particles having tailored variety of surface layers. Moreover, the development of a solution polymerization process which produces reliable nano-particles, particularly nano-particles advantageously employed in rubber compositions, has been elusive.

SUMMARY OF THE INVENTION

A multi-layer nano-particle composition including a poly(alkenylbenzene) core and at least two additional layers is provided. The nano-particles have a mean average diameter less than about 100 nm. As used herein, the use of the phrase "additional layers" reflects, for example, layers formed of divergent monomers or of the same monomers but having differing characteristics including molecular weight, vinyl modification, functionalization, etc. As one effective usual characteristic of the present nano-particles, they can be described as onion-like in view of their multiple layers.

A process for forming a multi-layer nano-particle is also provided. The process includes initiating the block copolymerization of a first monomer in a hydrocarbon solvent to form a living polymerization mixture. At least a second monomer is then added to the polymerization mixture and polymerized to form a living polymer chain. An alkenylbenzene monomer is also added to the polymerization mixture and allowed to polymerize onto the living polymer chain. The living polymer chains are made to aggregate to form micelles and at least one crosslinking agent is added to the polymerization mixture to form crosslinked nano-particles having a poly(alkenylbenzene) core and at least two additional layers.

A rubber composition including an elastomer, nano-particles, carbon black, silica and a curing agent having low shrinkage properties is also provided. A process for preparing the rubber compound is similarly provided. Such compound shows its relatively high hysterisis, good tensile strength, good tear strength, strong resistance to creep, high temperature resistance, and good aging properties. A process of making the rubber compound for engine mount applications is similarly provided.

Herein throughout, unless specifically stated otherwise:
"vinyl-substituted aromatic hydrocarbon" and "alkenylbenzene" are used interchangeably; and
"rubber" refers to rubber compounds, including natural rubber, and synthetic elastomers including styrene-butadiene rubber, ethylene propylene rubber, etc., which are known in the art.

DETAILED DESCRIPTION OF ILLUSTRATIVE EMBODIMENTS

General Nano-Particle Process of Formation

Figure 1:
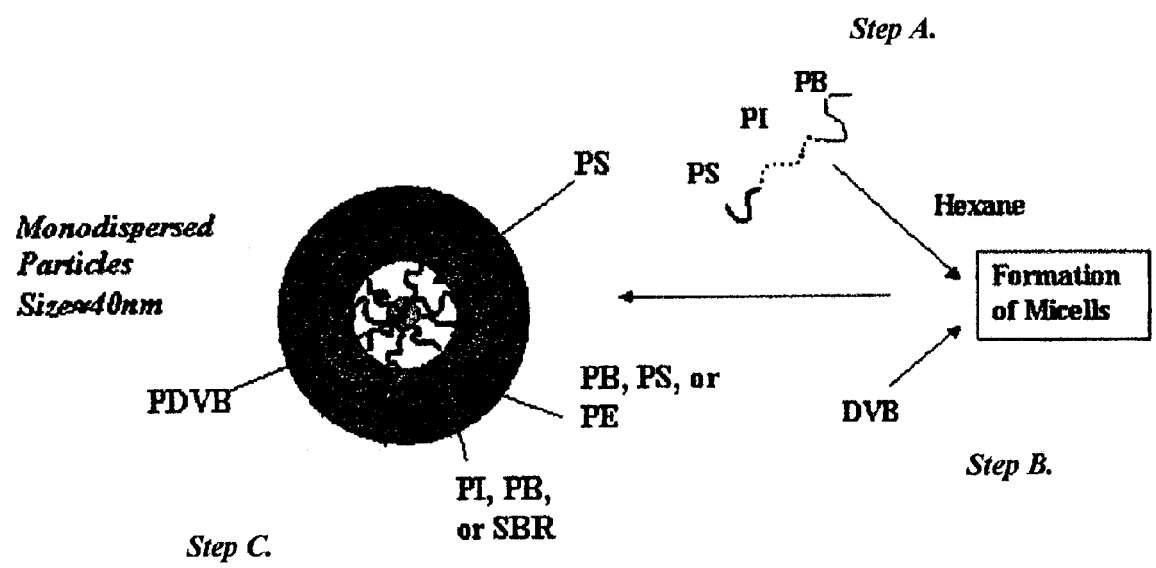
FIG. 1 is a schematic depicting the principle of formation of multi-layer nano-particles.

This application incorporates by reference U.S. Ser. Nos. 09/970,830 (filed Oct. 4, 2001), now U.S. Pat. No. 6,437,050, and U.S. Ser. No. 10/038,748 (filed Dec. 31, 2001) and U.S. Ser. No. 10/223,393 (filed Aug. 19, 2002).

One exemplary polymer nano-particle of the present invention is formed from multiblock polymer chains having at least three blocks selected primarily from poly(conjugated diene) block and poly(alkenylbenzene) blocks. Of course, the various monomer constituents may be present to a limited extent in the blocks of another selected monomer. In addition, the present invention anticipates nano-particles wherein one or more layers are formed of a random copolymer of two or more monomer units.

The poly(alkenylbenzene) blocks may be crosslinked to form the desired nanoparticles. The nano-particles have diameters—expressed as a mean average diameter—that are preferably less than about 100 nm, more preferably less than about 75 nm, and most preferably less than about 50 nm. The nano-particles preferably are substantially monodisperse and uniform in shape. The dispersity is represented by the ratio of $M_w$ to $M_n$, with a ratio of 1 being substantially monodisperse. The polymer nano-particles of the present invention preferably have a dispersity less than about 1.3, more preferably less than about 1.2, and most preferably less than about 1.1. Moreover, the nano-particles are preferably spherical, though shape defects are acceptable, provided the nano-particles generally retain their discrete nature with little or no polymerization between particles.

The nano-particles are preferably formed via dispersion polymerization, although emulsion polymerization is also contemplated. Hydrocarbons are preferably used as the dispersion solvent. Suitable solvents include aliphatic hydrocarbons, such as pentane, hexane, heptane, octane, nonane, decane, and the like, as well as alicyclic hydrocarbons, such as cyclohexane, methyl cyclopentane, cyclooctane, cyclopentane, cycloheptane, cyclononane, cyclodecane and the like. These hydrocarbons may be used individually or in combination. However, as more fully described herein below, selection of a solvent in which one polymer forming the nano-particles is more soluble than another polymer forming the nano-particles is important in micelle formation.

With respect to the monomers and solvents identified herein, nano-particles are formed by maintaining a temperature that is favorable to polymerization of the selected monomers in the selected solvent(s). Preferred temperatures are in the range of about –40 to 250° C., with a temperature in the range of about 0 to 150° C. being particularly preferred. As described in more detail below, the interaction of monomer selection, temperature and solvent, facilitates the formation of block polymers which form micelles and ultimately the desired nano-particles.

According to one embodiment of the invention, a first multiblock polymer is formed of at least vinyl aromatic hydrocarbon monomers and conjugated diene monomers in the hydrocarbon solvent. The multiblock polymer contains at least one block that is soluble in the dispersion solvent, preferably a conjugated diene monomer, and at least an end block which is less soluble in the dispersion solvent, preferably a vinyl-substituted aromatic hydrocarbon monomer. Moreover, in one embodiment, a vinyl-substituted aromatic hydrocarbon monomer is chosen the polymer of which is generally insoluble in the dispersion solvent.

As is known in the art, such a multiblock copolymer may be formed by living anionic polymerization, in which each block is formed by adding a new monomer charge to a living polymerization mixture in which polymerization is substantially complete.

Additionally, other blocks are incorporated into the block copolymer, including additional poly(conjugated diene) blocks or poly(alkenylbenzene) blocks, as well as other blocks such as poly(alkylene) blocks. Other suitable monomer units include ethylene oxide, methyl methacrylate, nitriles, acrylates, and mixtures thereof.

Another method of forming substantially multiblock polymers is the living anionic copolymerization of a mixture of monomers, such as a conjugated diene monomer and a vinyl-substituted aromatic hydrocarbon monomer in a hydrocarbon solvent, particularly, in the absence of certain polar additives, such as ethers, tertiary amines, or metal alkoxides which could otherwise effect the polymerization of the separately constituted polymer blocks. Of course, certain advantages may be achieved via a random polymerization of at least one block of the polymer.

However, since more than one additional polymer block is to be incorporated into the nano-particle, it may be preferred to utilize the first-described polymerization technique, wherein subsequent monomer units are added after substantially complete polymerization of each previous block.

Such multi-block polymers, are believed to aggregate to form micelle-like structures, with for example, vinyl-substituted aromatic blocks directed toward the centers of the micelles and all other blocks as tails extending therefrom. It is noted that a further hydrocarbon solvent charge or a decrease in polymerization mixture temperature may also be used, and may in fact be required, to obtain formation of the micelles. Moreover, these steps may be used to take advantage of the general insolubility of the vinyl-aromatic blocks. An exemplary temperature range for micelle formation is between about 0 and 100° C., more preferably between about 20 and 80° C.

Although the above describes formation of multi-block polymers prior to micelle formation, it is noted that after the micelles have formed, additional monomer charge(s), such as conjugated diene monomer and/or vinyl-substituted aromatic hydrocarbon monomer, can be added to the polymerization mixture as desired. In this manner, multiblock polymers may again be formed when only diblock polymers form the micelles. Moreover, it is feasible to form the micelles of the block co-polymers with a further monomer(s) charge thereafter.

After formation of the micelles, a cross-linking agent is added to the polymerization mixture. Preferably a crosslinking agent is selected which has an affinity to the vinyl-substituted aromatic hydrocarbon monomer blocks and migrates to the center of the micelles due to its compatibility with the monomer units and initiator residues present in the center of the micelle and its relative incompatibility with the dispersion solvent and monomer units present in the outer layer of the micelle. The crosslinking agent crosslinks the center core of the micelle (i.e. alkenylbenzene) to form the desired nano-particle. Consequently, nano-particles are formed from the micelles with a core including, for example, styrene monomer units and a surface layer including, for example, butadiene monomer units. Reference to FIG. 1 schematically depicts the above-described process, including a Step A (polymerization); Step B (micelle formation); and Step C (nanoparticle formation).

The conjugated diene monomers contemplated for the block polymer are those soluble in non-aromatic hydrocarbon solvents. $C_4$–$C_8$ conjugated diene monomers are the most preferred. Exemplary conjugated diene monomers include 1,3-butadiene, isoprene, and 1,3-pentadiene.

Vinyl-substituted aromatic hydrocarbon monomers include styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons, and mixtures thereof.

The multiblock polymer, preferably has $M_w$ of about 5,000 to 1,000,000, more preferably between about 10,000 and 100,000. A typical multiblock polymer will be comprised of 5 to 8% by weight conjugated diene and 95 to 5% by weight vinyl-substituted aromatic hydrocarbon, more preferably 30 to 70% by weight, and most preferably 40 to 60% by weight of each contributed monomer type, with the weight being distributed among multiple blocks if more than one block of each contributed monomer type is present.

The micelle formed by the above described polymerization is preferably crosslinked to enhance the uniformity and permanence of shape and size of the resultant nano-particle. Preferred crosslinking agents are di- or tri-vinyl-substituted aromatic hydrocarbons. However, crosslinking agents which are at least bifunctional, wherein the two functional groups are capable of reacting with vinyl-substituted aromatic hydrocarbon monomers are acceptable. A preferred crosslinking agent is divinylbenzene (DVB).

A 1,2-microstructure controlling agent or randomizing modifier is optionally used to control the 1,2-microstructure in the conjugated diene contributed monomer units, such as 1,3-butadiene, of the nano-particle. Suitable modifiers include hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo [2.2.2] octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxolanyl propanes (OOPs), 2,2-bis-(4-methyl dioxane), and bistetrahydrofuryl propane. A mixture of one or more randomizing modifiers also can be used. The ratio of the modifier to the monomers can vary from a minimum as low as 0 to a maximum as great as about 4000 millimoles, preferably about 0.01 to 3000 millimoles, of modifier per hundred grams of monomer currently being charged into the reactor. As the modifier charge increases, the percentage of 1,2-microstructure (vinyl content) increases in the conjugated diene contributed monomer units in the surface layer of the polymer nano-particle. The 1,2-microstructure content of the conjugated diene units is preferably between about 5% and 95%, and preferably less than about 35%.

Without being bound by theory, it is believed that an exemplary micelle will be comprised of ten to five hundred multiblock polymers yielding, after crosslinking, a nano-particle having a $M_w$ of between about 5,000 and 10,000,000, preferably between about 5,000 and 4,500,000.

Structural Modifications

In an alternative embodiment, at least one layer of the polymer nano-particle includes a copolymer including at least one alkenylbenzene monomer unit and at least one conjugated diene monomer unit. The copolymer may be random or ordered. In one such embodiment the copolymer layer includes a SBR rubber. Herein throughout, references to a poly (conjugated diene) layer are understood to include copolymers of the type described here.

Similarly, the density of the nanoparticle may be controlled by including monoblock, diblock, and/or multiblock polymer chains in the micelles. One method for forming such polymer chains includes forming a first polymer in the hydrocarbon solvent. After formation of the first polymer, a second monomer is added to the polymerization, along with additional initiator. The second monomer polymerizes onto the first polymer to form a living diblock polymer as well as forming a separate second polymer which is a living monoblock polymer. A third polymer may then be added along with additional initiator. The third polymer would polymerize onto the diblock polymer to form a multiblock onto the monoblock polymer to form a diblock, as well as forming a third polymer which is a living monoblock polymer. The multiblock polymer contains at least a first end block that is soluble in the dispersion solvent, and a second end block which is less soluble in the dispersion solvent, preferably the vinyl-substituted aromatic hydrocarbon monomer.

Without being bound by theory, it is believed that a large number of mono-block polymer chains in the core of the nano-particle results in and less entanglement of the tails of the diblock and multiblock chains. The resultant surface layer thus may have a brush-like structure.

The mono-block polymer preferably has $M_w$ between about 1,000 and 1,000,000, more preferably between about 5,000 and 100,000. The multi-block polymer preferably has $M_w$ of about 1,000 to 1,000,000 more preferably between about 5,000 and 100,000. The diblock polymer preferably has a $M_w$ of about 1,000 to 1,000,000, more preferably between about 5,000 and 100,000.

The density of the surface layers of the nano-particles may be controlled by manipulating the ratio of multiblock to diblock to mono-block polymer chains. This ratio may be manipulated by altering the amount of initiator added during each step of the polymerization process. For example, a greater amount of initiator added during the first polymerization step than added during subsequent polymerization steps would favor multiblock formation over mono-block formation, resulting in a high density surface layer. Conversely, a greater amount of initiator added during the subsequent polymerization steps than added during the first polymerization step would favor mono-block or diblock formation over multi-block formation, resulting in a low-density surface layer. The ratio of the initiator added during the subsequent polymerization steps to that added during the first polymerization step can range from about 0 to 10.

Hydrogenation of a Nano-Particle Surface Layer

After micelle formation, or alternatively, after crosslinking, polydiene blocks, for example, may be hydrogenated to form a desired surface layer. Furthermore, one or more poly (conjugated diene) blocks can be selectively hydrogenated while leaving additional poly (conjugated diene) blocks non-hydrogenated. A hydrogenation step may be carried out by methods known in the art for hydrogenating polymers, particularly polydienes. A preferred hydrogenation method includes placing the crosslinked nano-particles in a hydrogenation reactor in the presence of a catalyst. After the catalyst has been added to the reactor, hydrogen gas ($H_2$) is charged to the reactor to begin the hydrogenation reaction. The pressure is adjusted to a desired range via addition of $H_2$, preferably between about 10 and 3000 kPa, more preferably between about 50 and 2600 kPa. $H_2$ may be charged continuously or in individual charges until the desired conversion is achieved. Preferably, the hydrogenation reaction will reach at least about 20% conversion, more preferably greater than about 85% conversion. The conversion reaction may be monitored by $H^1$ NMR.

Preferred catalysts include known hydrogenation catalysts such as Pt, Pd, Rh, Ru, Ni, and mixtures thereof. The catalysts may be finely dispersed solids or absorbed on inert supports such as carbon, silica, or alumina. Especially preferred catalysts are prepared from nickel octolate, nickel ethylhexanoate, and mixtures thereof.

The layers formed by an optional hydrogenation step will vary depending on the identity of the monomer units utilized in the formation of poly (conjugated diene) blocks. For example, if a poly(conjugated diene) block contains 1,3-butadiene monomer units, the resultant nano-particle layer after hydrogenation will be a crystalline poly(ethylene) layer. In another embodiment, a layer may include both ethylene and propylene units after hydrogenation if the non-hydrogenated poly (conjugated diene) block contains isoprene monomer units. It should be noted that the non-hydrogenated poly (conjugated diene) block may contain a mixture of conjugated diene monomer units, resulting in a mixture of monomer units after hydrogenation.

Initiators and Functionalized Nano-Particles

The present inventive process is preferably initiated via addition of anionic initiators that are known in the art as useful in the copolymerization of diene monomers and vinyl aromatic hydrocarbons. Exemplary organo-lithium catalysts include lithium compounds having the formula $R(Li)_x$, wherein R represents a $C_1$–$C_{20}$ hydrocarbyl radical, preferably a $C_2$–$C_8$ hydrocarbyl radical and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, t-butyl, etc.

Specific examples of exemplary initiators include ethyllithium, propyllithium, n-butyllithium, sec-butyllithium, tert-butyllithium, and the like; aryllithiums, such as phenyllithium, tolyllithium, and the like; alkenyllithiums such as vinyllithium, propenyllithium, and the like; alkylene lithium such as tetramethylene lithium, pentamethylene lithium, and the like. Among these, n-butyllithium, sec-butyllithium, tert-butyllithium, tetramethylene lithium, and mixtures thereof are preferred. Other suitable lithium inititators include one or more of: p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

Functionalized lithium initiators are also contemplated as useful in the present copolymerization. Preferred functional groups include amines, formyl, carboxylic acids, alcohols, tin, silica, and mixtures thereof.

Especially preferred initiators are amine-functionalized initiators, such as those that are the reaction product of an amine, an organo lithium and a solubilizing component. The initiator has the general formula:

(A)Li(SOL)$_y$ where y is from about 1 to about 3; SOL is a solubilizing component selected from the group consisting of hydrocarbons, ethers, amines or mixtures thereof; and, A is selected from the group consisting of alkyl, dialkyl and cycloalkyl amine radicals having the general formula:

and cyclic amines having the general formula:

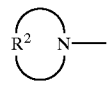

where $R^1$ is selected from the group consisting of alkyls, cycloalkyls or aralkyls having from 1 to about 12 carbon atoms, and $R^2$ is selected from the group consisting of an alkylene, substituted alkylene, oxy- or N-alkylamino-alkylene group having from about 3 to about 16 methylene groups. An especially preferred functionalized lithium initiator is hexamethylene imine propyllithium.

Tin functionalized lithium initiators may also be preferred as useful in the present invention. Suitable tin functionalized lithium initiators include tributyl tin lithium, trioctyl tin lithium, and mixtures thereof.

Anionic initiators generally are useful in amounts ranging from about 0.01 to 60 millimoles per hundred grams of monomer charge.

A nano-particle including multiblock polymers initiated with a functionalized initiator may include functional groups on the surface of the nano-particle. For example, when block polymers are initiated by hexamethylene imine propyllithium, the initiator residue remaining at the beginning of the polymer chain will contain an amine group. Once the polymer chains have aggregated and have been crosslinked, the resultant nano-particles will contain amine groups on or near the nano-particle surface.

An exemplary nano-particle formed from copolymers initiated by a functionalized tin lithium initiator may have a crosslinked alkenylbenzene core, for example polystyrene, and a surface layer including at least a poly(conjugated diene), for example 1,3-butadiene. The surface layer will also include a functionalized initiator residue at the individual chain ends (i.e., tin).

Polymer Nano-Particle Applications

A variety of applications are contemplated for use in conjunction with the nano-particles of the present invention. Furthermore, the several mechanisms described herein for modifying the nano-particles render them more suitable for different applications. All forms of the present inventive nano-particles are, of course, contemplated for use in each of the exemplary applications and all other applications envisioned by the skilled artisan.

General Rubber

After the polymer nano-particles have been formed, they may be blended with a rubber to improve the physical characteristics of the rubber composition. Nano-particles are useful modifying agents for rubbers because they are discrete particles which are capable of dispersing uniformly throughout the rubber composition, resulting in uniformity of physical characteristics. Furthermore, certain of the present polymer nano-particles are advantageous because various layers including poly(conjugated diene), especially vinyl-modified poly(conjugated diene), are capable of bonding with a rubber matrix due to the accessibility of the double bonds in the poly(conjugated diene).

The present polymer nano-particles are suitable for modifying a variety of rubbers including, but not limited to, random styrene/butadiene copolymers, butadiene rubber, poly(isoprene), nitrile rubber, polyurethane, butyl rubber, EPDM, and the like. Advantageously, the inclusion of the present nano-particles have demonstrated rubbers having improved tensile and tear strength of at least about 30% over a rubber modified with non-spherical copolymers.

Furthermore, nano-particles with hydrogenated layers may demonstrate improved compatibility with specific rubbers. For example, nano-particles including a hydrogenated polyisoprene layer may demonstrate superior bonding with and improved dispersion in an EPDM rubber matrix due to the compatibility of hydrogenated isoprene with EPDM rubber.

Additionally, nano-particles with copolymer layers may demonstrate improved compatibility with rubbers. The copolymer tails within a layer of the nano-particles may form a brush-like surface. The host composition is then able to diffuse between the tails allowing improved interaction between the host and the nano-particles.

Hard Disk Technology

Hydrogenated nano-particles prepared in accordance with the present invention may also find application in hard disk technology.

Disk drive assemblies for computers traditionally include a magnetic storage disk coaxially mounted about a spindle apparatus that rotates at speeds in excess of several thousand revolutions per minute (RPM). The disk drive assemblies also include a magnetic head that writes and reads information to and from the magnetic storage disk while the magnetic disk is rotating. The magnetic head is usually disposed at the end of an actuator arm and is positioned in a space above the magnetic disk. The actuator arm can move relative to the magnetic disk. The disk drive assembly is mounted on a disk base (support) plate and sealed with a cover plate to form a housing that protects the disk drive assembly from the environmental contaminant outside of the housing.

Serious damage to the magnetic disks, including loss of valuable information, can result by introducing gaseous and particulate contaminates into the disk drive assembly housing. To substantially prevent or reduce the introduction of gaseous and particulate contaminants into the disk drive housing, a flexible sealing gasket is disposed between the disk drive mounting base (support) plate and the disk drive assembly housing or cover plate. A sealing gasket is usually prepared by punching out a ring-shaped gasket from a sheet of cured elastomer. The elastomeric gasket obtained is usually attached to the base plate of the disk drive assembly mechanically, such as affixing the gasket with screws, or adhesives. The hydrogenated nano-particles, when compounded with a polyalkylene and a rubber, demonstrate a tensile strength comparable to that necessary in hard disk drive compositions.

Thermoplastic Gels

Nano-particles prepared in accord with the present invention, whether hydrogenated or non-hydrogenated may also be blended with a variety of thermoplastic elastomers, such as SEPS, SEBS, EEBS, EEPE, polypropylene, polyethylene, polystyrene, and mixtures thereof. For example, nano-particles with hydrogenated isoprene layers may be blended with a SEPS thermoplastic to improve tensile strength and thermostability. These blends of thermoplastic elastomer and nano-particles would typically be extended as known in the art. For example, suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in compositions of the present invention are low molecular weight organic materials having a number-average molecular weight of less than 20,000, preferably less than 10,000, and most preferably less than 5000. Although there is no limitation to the material which may be employed, the following is a list of examples of appropriate materials:

(1) Softening agents, namely aromatic naphthenic and parraffinic softening agents for rubbers or resins;

(2) Plasticizers, namely plasticizers composed of esters including phthalic, mixed pthalic, aliphatic dibasic acid, glycol, fatty acid, phosphoric and stearic esters, epoxy plasticizers, other plasticizers for plastics, and phthalate, adipate, scbacate, phosphate, polyether and polyester plasticizers for NBR;

(3) Tackifiers, namely coumarone resins, coumaronein- dene resins, terpene phenol resins, petroleum hydrocarbons and rosin derivative;

(4) Oligomers, namely crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-a-olefins;

(5) Lubricants, namely hydrocarbon lubricants such as paraffin and wax, fatty acid lubricants such as higher fatty acid and hydroxy-fatty acid, fatty acid amide lubricants such as fatty acid amide and alkylene-bisfatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and, (6) Petroleum hydrocarbons, namely synthetic terpene resins, aromatic hydrocarbon resins, aliphatic hydrocarbon resins, aliphatic or alicyclic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes. One or more of these materials may be used in as extenders.

Surface functionalized nano-particles prepared in accordance with the present invention, whether hydrogenated or non-hydrogenated, may also be compounded with silica containing rubber compositions. Including surface functionalized nano-particles in silica containing rubber compositions has been shown to decrease the shrinkage rates of such silica containing rubber compositions. Functionalized nano-particles may be compounded in silica compositions in concentrations up to about 50 wt % of the total composition, more preferably up to about 40 wt % most preferably up to about 30 wt %.

Tire Rubber

One application for such rubber compounds is in tire rubber formulations.

Vulcanizable elastomeric compositions of the invention are prepared by mixing a rubber, a nanoparticle composition, with a reinforcing filler comprising silica, or a carbon black, or a mixture of the two, a processing aid and/or a coupling agent, a cure agent and an effective amount of sulfur to achieve a satisfactory cure of the composition.

The preferred rubbers are conjugated diene polymers, copolymers or terpolymers of conjugated diene monomers and monovinyl aromatic monomers. These can be utilized as 100 parts of the rubber in the tread stock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene rubber, styrene-isoprene-butadiene rubber, butadiene-isoprene rubber, polybutadiene, butyl rubber, neoprene, acrylonitrile-butadiene rubber (NBR), silicone rubber, the fluoroelastomers, ethylene acrylic rubber, ethylene-propylene rubber, ethylene-propylene terpolymer (EPDM), ethylene vinyl acetate copolymer, epicholrohydrin rubber, chlorinated polyethylene-propylene rubbers, chlorosulfonated polyethylene rubber, hydrogenated nitrile rubber, terafluoroethylene-propylene rubber, and the like.

Examples of reinforcing silica fillers which can be used in the vulcanizable elastomeric composition include wet silica (hydrated silicic acid), dry silica (anhydrous silicic acid), calcium silicate, and the like. Other suitable fillers include aluminum silicate, magnesium silicate, and the like. Among these, precipitated amorphous wet-process, hydrated silicas are preferred. Silica can be employed in the amount of about one to about 100 parts per hundred parts of the elastomer (phr), preferably in an amount of about 5 to 80 phr and, more preferably, in an amount of about 30 to about 80 phrs. The useful upper range is limited by the high viscosity imparted by fillers of this type. Some of the commercially available silica which can be used include, but are not limited to, HiSil® 190, HiSil® 210, HiSil® 215, HiSil® 233, HiSil® 243, and the like, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0, and J. M. Huber Corporation.

Including surface functionalized nano-particles in silica containing rubber compositions has been shown to decrease the shrinkage rates of such silica containing rubber compositions. Functionalized nano-particles may be compounded in silica compositions in concentrations up to about 30 wt % of the total composition, more preferably up to about 40 wt %, most preferably up to about 50 wt %.

The rubber can be compounded with all forms of carbon black, optionally additionally with silica. The carbon black can be present in amounts ranging from about one to about 100 phr. The carbon black can include any of the commonly available, commercially-produced carbon blacks, but those having a surface are of at least 20 m²/g and, or preferably, at least 35 m²/g up to 200 m²/g or higher are preferred. Among useful carbon blacks are furnace black, channel blacks, and lamp blacks. A mixture of two or more of the above blacks can be used in preparing the carbon black products of the invention. Typical suitable carbon black are N-110, N-220, N-339, N-330, N-352, N-550, N-660, as designated by ASTM D-1765-82a.

Certain additional fillers can be utilized including mineral fillers, such as clay, talc, aluminum hydrate, aluminum hydroxide and mica. The foregoing additional fillers are optional and can be utilized in the amount of about 0.5 phr to about 100.

Numerous coupling agent and compatibilizing agent are know for use in combining silica and rubber. Among the silica-based coupling and compatibilizing agents include silane coupling agents containing polysulfide components, or structures such as, for example, trialkoxyorganosilane polysulfides, containing from about 2 to about 8 sulfur atoms in a polysulfide bridge such as, for example, bis-(3-triethoxysilylpropyl) tetrasulfide (Si69), bis-(3-triethoxysilylpropyl) disulfide (Si75), and those alkyl alkoxysilanes of the such as octyltriethoxy silane, and hexyltrimethoxy silane.

It is readily understood by those having skill in the art that the rubber composition would be compounded by methods generally known in the rubber compounding art, such as mixing the various vulcanizable polymer(s) with various commonly used additive materials such as, for example, curing agents, activators, retarders and accelerators processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in the conventional amounts.

Specifically, the above-described nano-particle containing rubber compounds are contemplated for use in rubber compounds used to make tire treads and side walls due to the enhanced reinforcement capabilities of the present nano-particles. The higher dynamic modulus (G') and its lower temperature dependence along with the lower hystersis values at high temperatures leads to improved cornering, handling, dry, snow, and wet traction, rolling resistance, dispersion, and aging properties of the resultant tire compositions. Tin-functionalized nano-particles are especially suited for use in tire compositions. Improved aging properties, thermal aging (high temperature), or mechanical aging (static or dynamic deformation cycles), include retention of the G' modulus, hysteresis, mechanical strengths, etc. Tin-functionalized nano-particles are especially suited for use in tire compositions. Nano-particles including a copolymer layer are also suitable for use in such tire compositions, because the longer copolymer chains in the layer lead to greater diffusion of the host rubber composition into the surface layer of the nano-particle. Of course, a functionalized nano-particle having at least one copolymer layer, i.e., the combination of the two alternatives may be most beneficial.

Engineering Plastic and Others

Similarly, the nano-particles can be added into typical plastic materials, including polyethylene, polypropylene, polystyrene, polycarbonate, nylon, polyimides, etc. to for example, enhance impact strength, tensile strength and damping properties.

Of course, the present inventive nano-particles are also suited to other presently existing applications for nano-particles, including the medical field, e.g. drug delivery and blood applications, information technology, e.g. quantum computers and dots, aeronautical and space research, energy, e.g., oil refining, and lubricants.

Engine Mount, Etc.

Another application for such rubbers is in situations requiring superior damping properties, such as engine mounts and hoses (e.g. air conditioning hoses). Rubber compounds of high mechanical strength, super damping properties, and strong resistance to creep are demanded in engine mount manufacturers. In engine mounts, a rubber, because it sits most of its life in a packed and hot position, requires very good characteristics. Utilizing the nano-particles within selected rubber formulations can improve the characteristics of the rubber compounds.

The present invention now will be described with reference to non-limiting examples. The following examples and tables are presented for purposes of illustration only and are not to be construed in a limiting sense.

EXAMPLES

Preparation of Multi-Layer Nano-Particles

An 8 L reactor equipped with external jacket heating and internal agitation was used for all polymerizations. 1,3-Butadiene was used as a 22.0 or 21.1 wt % solution in hexane (Bridgestone/Firestone Polymer Co., Akron, Ohio). Styrene was used as a 33.0 wt. % solution in hexane (Bridgestone/Firestone Polymer Co., Akron, Ohio), and n-butyllithium was used as a 15 wt % solution in hexane (Bridgestone/Firestone Polymer Co., Akron, Ohio). An antioxidant butylated hydroxytoluene (BHT), (Aldrich Chem. Co., Milwaukee, Wis.) was used as an approximately 17 wt % solution in hexane. Technical grade divinylbenzene (DVB), (80% as a mixture of isomers, Aldrich) was passed through a column of inhibitor remover under $N_2$ before use. Neat bis-oxalanyl propane (OOPs), (Aldrich) was similarly treated and used as a 1.6 M solution in hexane, stored over calcium hydride.

Example 1

Figure 2:
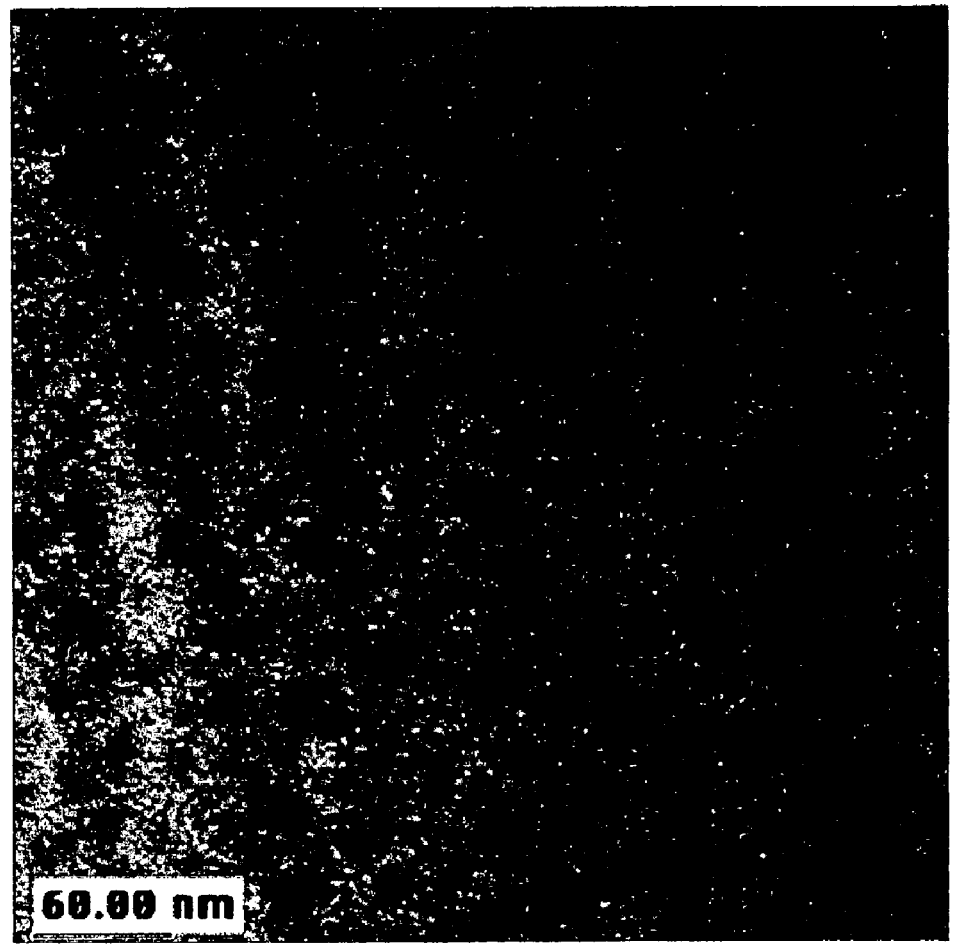
FIG. 2 is a transmission electron microscopy (TEM) photograph of multi-layer nano-particles produced in accordance with EXAMPLE 1.

The reactor was first charged with 2.3 kg of hexane. The reactor was then charged with 517 g butadiene/hexane blend that contained 22 wt % butadiene, and the batch was heated to 57° C. After the temperature stabilized, polymerization was initiated with 5.4 mL of a 1.5 M solution of n-butyl lithium in hexane. The reactor batch temperature was maintained at 57° C. for the duration of the polymerization. After 2 hours, (when the reaction was finished) the reactor was charged with 4.5 kg of isoprene/hexane blend that contained 15% isoprene. After 1.5 hours, the reactor was charged with 453 g of a styrene/hexane blend that contained 33 wt % styrene. After an additional 1.5 hours, the reactor was charged with 50 mL of divinyl benzene. The reactor was maintained at 57° C. for a 2-hour period and then discharged. The product was dropped into an acetone/isopropanol (~95/5) blend, and dried. GPC analysis of the product showed that the molecular weight ($M_w$) of the particle polymer is 954,390. The polydispersity of the product is 1.10. TEM analysis showed that the average particle size was ~30 nm, and the dispersity of the particle size was about 1.1 (see FIG. 2). The structure of the particle contains a polystyrene-core, a poly-isoprene layer, and a polybutadiene surface layer.

Example 2

A 4 L polymerization reactor was used for the preparation. The reactor was first charged with 3 L of a nano-particle/hexane solution, containing 10 wt % of example 1. The reactor was then charged with 75 mL of a Ni catalyst solution, which was made according to the following procedure.

111 mL of nickel octolate (8 wt % in hexane), 37 mL hexane, and 06 mL of cyclohexene were charged to a 1 liter $N_2$ purged bottle. Then, the bottle was placed into a dry ice bath. A charge of 266.4 mL of tributyl aluminum (0.68 M in hexane) was slowly added into the bottle while kept cool.

The hydrogenation reactor, containing polymer product and catalyst was then heated to 120° C. After the temperature stabilized, the hydrogenation was initialized by charging high pressure $H_2$ gas into the reactor to about 792 kPa. After about 15 minutes, the pressure dropped as the $H_2$ began to react. The reactor was again recharged to about 792 kPa. The procedure was then repeated until the butadiene hydrogenation conversion reached about 95%, based on $H^1$ NMR analysis. The reactor was then cooled and the product dropped into isopropanol solvent. The obtained polymer particles were dried in vacuum for 2 days at 23° C.

Figure 3:
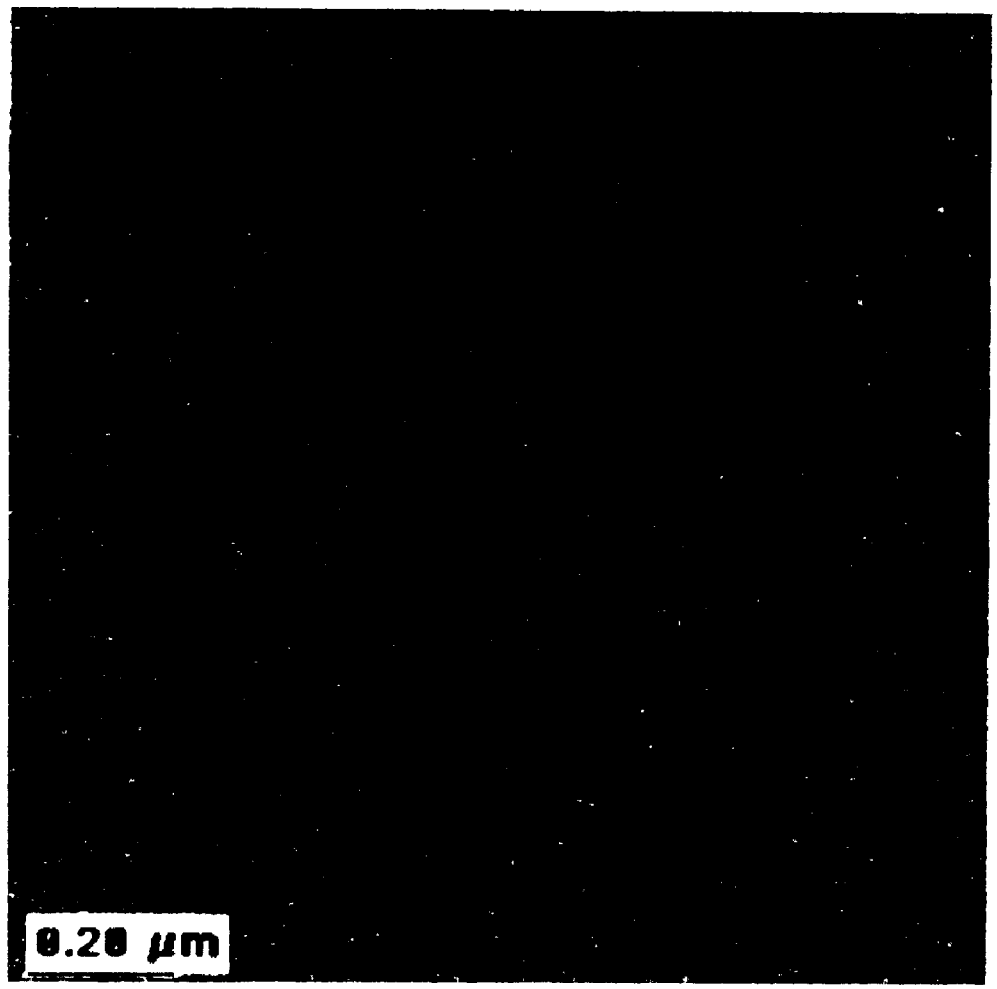
FIG. 3 is a TEM photograph of hydrogenated multi-layer nano-particles produced in accordance with EXAMPLE 2.

The procedure was repeated until the isoprene hydrogenation conversion reached 100% based on $H^1$ NMR analysis. TEM analysis showed that the average particle size was ~35 nm, and the dispersity was about 1.1 (see FIG. 3). The structure of the particle contained a polystyrene core, a poly(ethylene-co-propylene) layer, and a polyethylene shell.

Example 3

Figure 4:
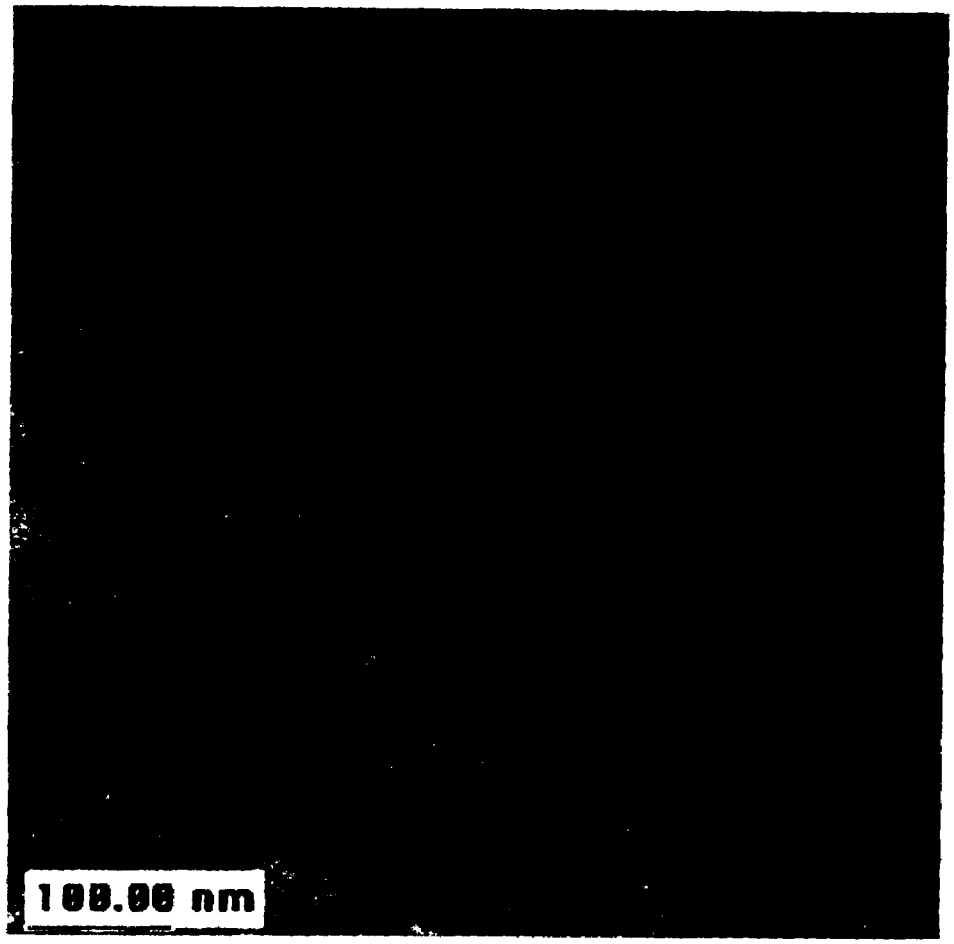
FIG. 4 is a TEM photograph of multi-layer nano-particles produced in accordance with EXAMPLE 3.

The reactor was first charged with 517 g of hexane. The reactor was charged with 340 g styrene/hexane blend containing 33 wt % styrene, and the batch was heated to 57° C. After the temperature had stabilized, polymerization was initiated with 5.4 mL of a 1.5 M solution of n-butyllithium in hexane. The reactor batch temperature was maintained at 57° C. for the duration of the polymerization. After 1.5 hours, (when the reaction was finished), the reactor was charged with 1.0 kg of butadiene/hexane blend that contained 22 wt % butadiene. After another 1.5 hours, the reactor was charged with 340 g of styrene/hexane blend that contained 33 wt % styrene. After an additional 1.5 hour reaction, the reactor was charged with 1.8 kg hexane. After 20 minutes, the reactor was charged with 50 mL of DVB for the crosslinking reaction. The reactor was maintained at 57° C. for another 1.5 hour period, then discharged. The product was dropped into acetone/isopropanol (~95/5) blend, and dried. GPC analysis of the product showed that the molecular weight ($M_w$) of the particle polymer was 3,271,180. The polydispersity was 1.08. TEM analysis showed that the average particle size was ~35 nm, and the dispersity of the particle size was about 1.1 (see FIG. 4). The structure of the particle contained the polystyrene core, the polybutadiene layer, and a polystyrene surface layer.

Examples 4–6

Three kinds of rubber compositions were prepared according to the formulation shown in Tables 1 and 2 by selectively using the synthesized onion like polymer particles (i.e., example 1) to replace 10 parts of butadiene rubber in the compound formulation. In each sample, a blend of the ingredients was kneaded by a method listed in Table 3. The final stock was sheeted and molded at 160° C. for about 30 minutes.

As shown in Table 4, the test compounds exhibited well balanced physical properties. At least, the tensile strength, dynamic modulus and damping properties were improved over that of the comparative compounds.

TABLE 1

| Composition for Master Batch | |
|---|---|
| Component | Pbw |
| Polybutadiene (HX 301) | 100.00 |
| Carbon black (N343) | 50.00 |
| Aromatic oil | 15.00 |
| Zinc oxide | 3.00 |
| Hydrocarbon resin (tackifiers) | 2.00 |
| Santoflex 13 (antioxidants) | 0.95 |
| Stearic acid | 2.00 |
| Wax | 1.00 |

TABLE 2

Composition for Final Batch

| Additional component added to master batch of table 14 | Pbw |
|---|---|
| Sulfur | ~1.30 |
| Cyclohexyl-benzothiazole sulfenamide (accelerator) | 1.40 |
| Diphenylguanidine (accelerator) | 0.20 |

TABLE 3

Mixing Conditions

| Mixer: 300 g Brabender | Agitation speed: 60 rpm |
|---|---|
| Master Batch Stage | |
| Initial Temperature | 110° C. |
| 0 minutes | Charging polymers |
| 0.5 minutes | Charging oil and carbon black |
| 5.0 minutes | Drop |
| Final Batch Stage | |
| Initial Temperature | 75° C. |
| 0 seconds | Charging master stock |
| 30 seconds | Charging curing agent and accelerators |
| 75 seconds | Drop |

TABLE 4

Experimental results of Multi-Layer Nano-particles:

| Example | | | 4 (control) | 5 | 6 |
|---|---|---|---|---|---|
| Test polymers | | Example 3 | | | 10 |
| | | Example 1 | | | 10 |
| Butadiene | | | 100 | 90 | 90 |
| Carbon black | | | 50 | 50 | 50 |
| Aromatic oil | | | 15 | 15 | 15 |
| Shore A | 22° C. (3 seconds) | | 56.1 | 60.7 | 58.4 |
| | 100° C. (3 seconds) | | 53.9 | 56.1 | 55.6 |
| Ring Tensile | | | | | |
| | 23° C. | Tb (kPa) | 13,511 | 14,200 | 12,926 |
| | | Eb (%) | 494 | 485 | 483 |
| | | M300 | 925 | 1060 | 950 |
| | | M50 | 151 | 187 | 166 |
| | 100° C. | Tb (kPa) | 6842 | 8068 | 7200 |
| | | Eb (%) | 355 | 383 | 362 |
| | | M300 | 780 | 835 | 806 |
| | | M50 | 122 | 135 | 130 |
| Ring Tear | Strength (kg/cm) | | 34.01 | 37.05 | 38.31 |
| | Travel (%) 170° C. | | 439 | 437 | 453 |
| Tg of compound (tan δ) | | | −75 | −75 | −75 |
| Dynastat | M' 50° C. (mPa) | | 6.7711 | 8.7605 | 7.6634 |
| | M' 23° C. (mPa) | | 7.8233 | 10.6590 | 9.1403 |
| | M' 0° C. (mPa) | | 9.6050 | 14.1940 | 11.6610 |
| | M' −20° C. (mPa) | | 11.3360 | 15.8320 | 13.000 |
| | tan δ 50° C. | | 0.18533 | 0.20372 | 0.19581 |
| | tan δ 23° C. | | 0.21062 | 0.22369 | 0.22109 |
| | tan δ 0° C. | | 0.23358 | 0.23813 | 0.24245 |
| | tan δ −20° C. | | 0.25302 | 0.25763 | 0.26128 |

The invention has been described with reference to the exemplary embodiments. Modifications and alterations will occur to others upon reading and understanding the specification. The invention is intended to include such modifications and alterations insofar as they come within the scope of the disclosure and claims.

We claim:

1. A multi-layer polymer nano-particle composition comprising:

a. a poly(alkenylbenzene) layer, and
   b. at least two additional polymer layers, wherein said nano-particles have a mean average diameter of less than about 100 nm.

2. The composition of claim 1 wherein at least one layer includes at least one functional group.

3. The composition of claim 2 wherein said functional group is selected from the group consisting of carboxylic acids, alcohols, amines, formyl, tin, silica, and mixtures thereof.

4. The composition of claim 1 wherein at least one layer is hydrogenated.

5. The composition of claim 1 wherein at least one layer includes vinyl-substituted aromatic hydrocarbon monomer units and conjugated diene units.

6. The composition of claim 1 wherein said poly(alkenylbenzene) layer is cross-linked.

7. The composition of claim 5 wherein at least one layer comprises a mono-block polymer.

8. The composition of claim 7 wherein said mono-block polymer and said multiblock polymer layers are cross-linked inside a core of said nano-particle.

9. The composition of claim 1 wherein at least one layer comprises poly (conjugated diene) monomer units with a 1, 2 microstructure content of at least about 35%.

10. The composition of claim 6 wherein said poly(alkenylbenzene) layer comprises substantially a center of the nano-particle.

11. The composition of claim 1 wherein said at least two additional polymer layers are selected from the group consisting of poly(alkenylbenzene), poly(conjugated diene), poly(alkylene), poly(acrylate), poly(nitrile), and mixtures thereof.

12. The composition of claim 1 wherein at least one of said at least two additional polymer layers are hydrogenated.

13. The composition of claim 1 wherein said poly(alkenyl/benzene) comprises styrene.

14. A nano-particle composition comprising:

a. a poly(alkenylbenzene) core,
   b. a polyalkylene surface layer comprising at least one alkylene contributed monomer unit, and
   c. at least one additional layer, wherein said nano-particles have a mean average diameter of less than about 100 nm.

15. The composition of claim 14 further comprising an initiator residue derived from an anionic polymerization initiator.

16. The composition of claim 15 wherein said initiator residue includes a functional group.

17. The composition of claim 14 wherein said polyalkylene surface layer is formed by hydrogenating a poly(conjugated diene) layer.

18. The composition of claim 14 further comprising a crosslinking agent.

19. A polymer nano-particle comprising:

a. a poly(alkenylbenzene) core,
   b. at least two additional layers, one of which comprises an outer layer, and wherein said nano-particles have a mean average diameter of less than about 100 nm.

c. said outer layer including a functional group.

20. The composition of claim 19 wherein said functional group is a component of an initiator residue.

21. The composition of claim 19 wherein said initiator residue is derived from a funictionalized anionic polymerization initiator.

22. The composition of claim 21 wherein said functionalized anionic polymerization initiator is hexamethylene imine propyllithium.

23. The composition of claim 19 wherein said functional group is selected from the group consisting of carboxylic acids, alcohols, amines, tin, silica, and mixtures thereof.

24. The composition of claim 21 wherein said functionalized anionic polymerization initiator is tributyl tin lithium.

25. The composition of claim 19 wherein at least one of said additional layers includes alkenylbenzene monomer units.

26. The composition of claim 19 wherein one of at least two additional layers includes polyalkylene formed by hydrogenating a poly(conjugated diene) layer.

27. The composition of claim 19 further comprising a crosslinking agent.

28. The composition of claim 27 wherein said crosslinking agent comprises a multi-functional organic compound.

* * * * *